Jan. 5, 1943.  C. A. BREWER  2,307,619
POWER DEVICE
Filed Jan. 25, 1939  6 Sheets-Sheet 1
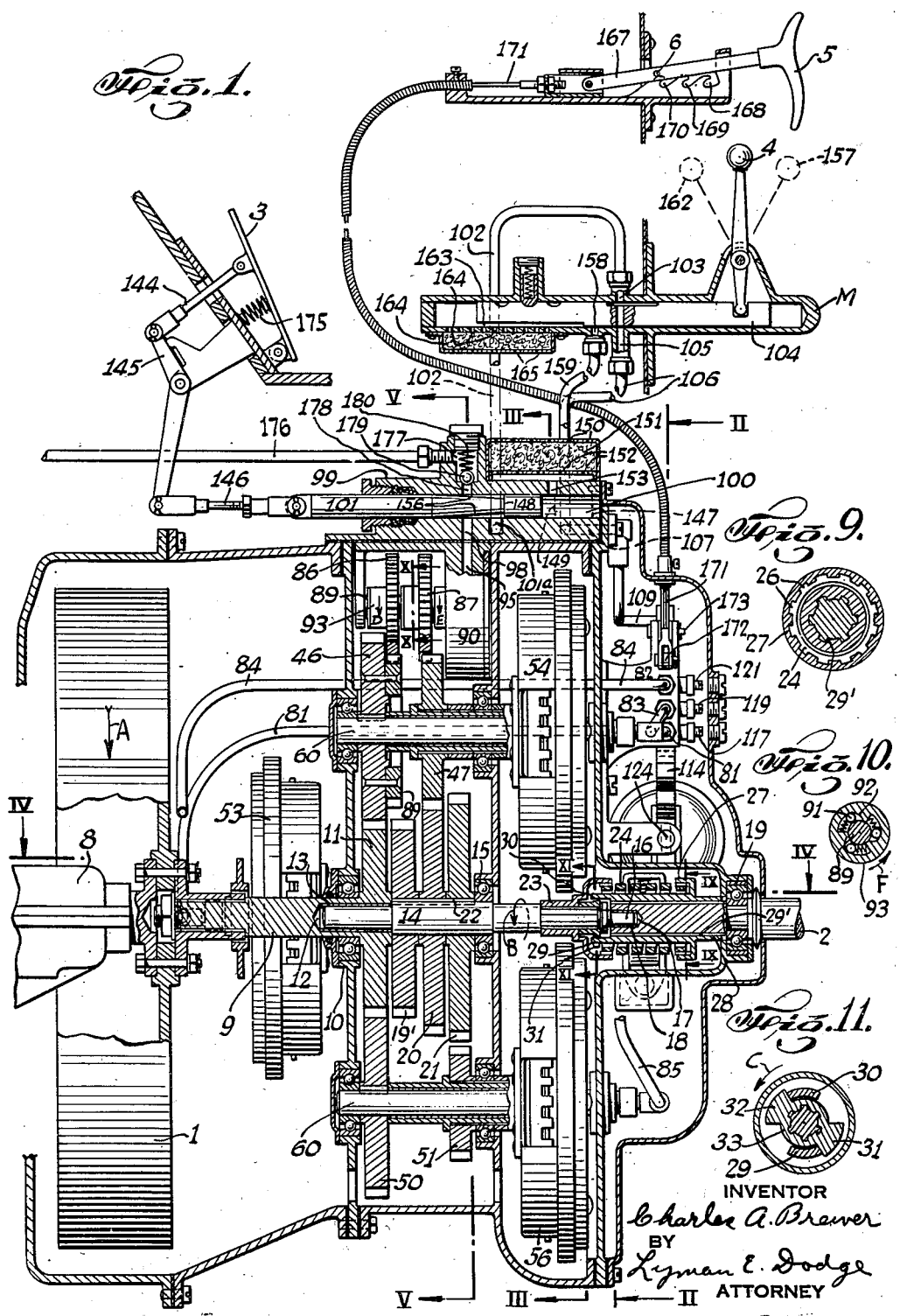
INVENTOR
Charles A. Brewer
BY
Lyman E. Dodge
ATTORNEY

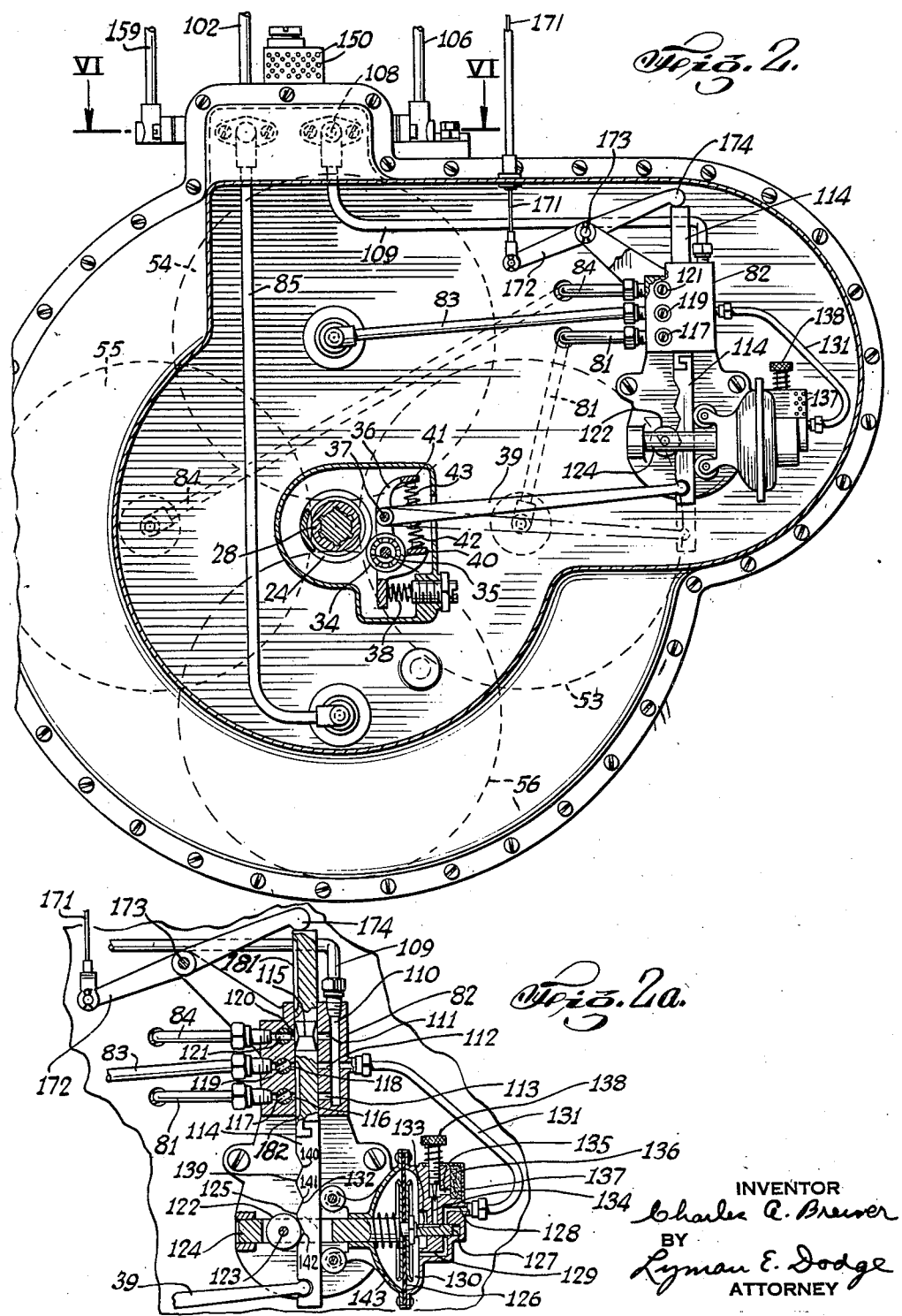

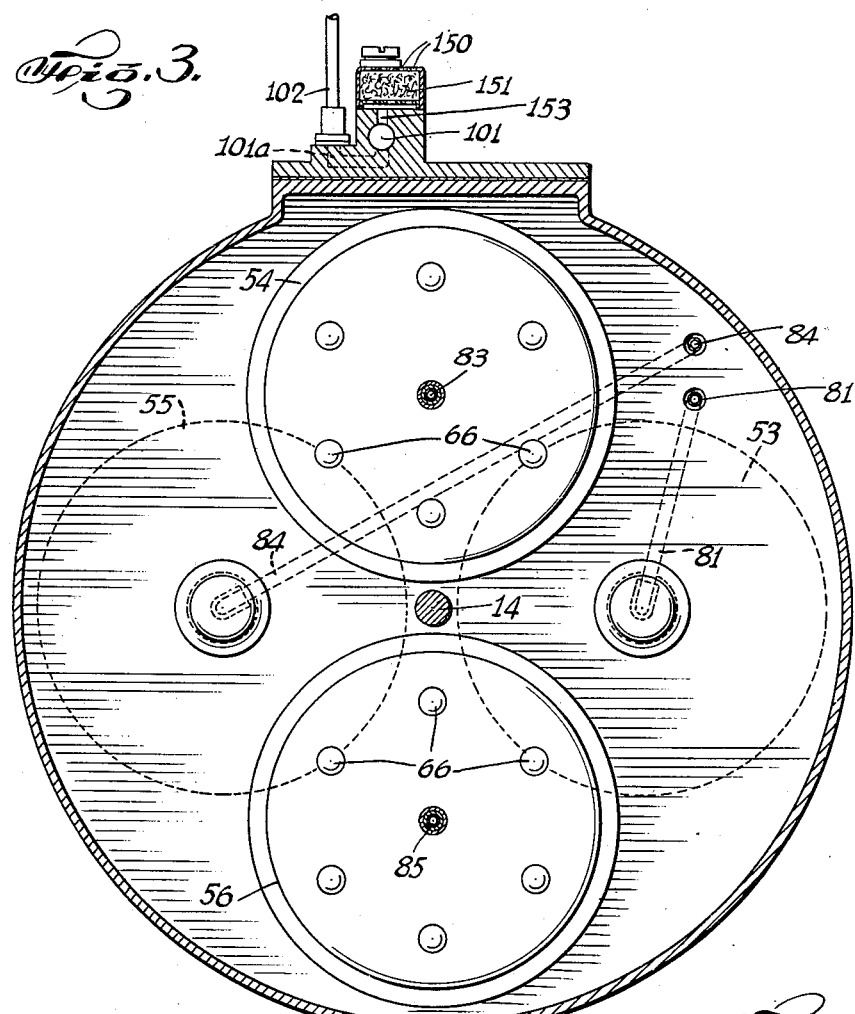
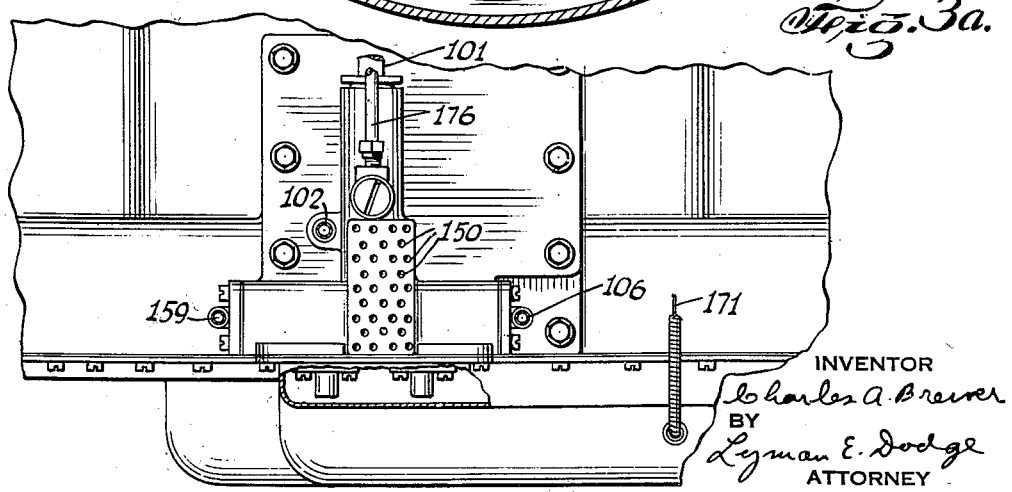

Jan. 5, 1943.   C. A. BREWER   2,307,619
POWER DEVICE
Filed Jan. 25, 1939   6 Sheets-Sheet 4
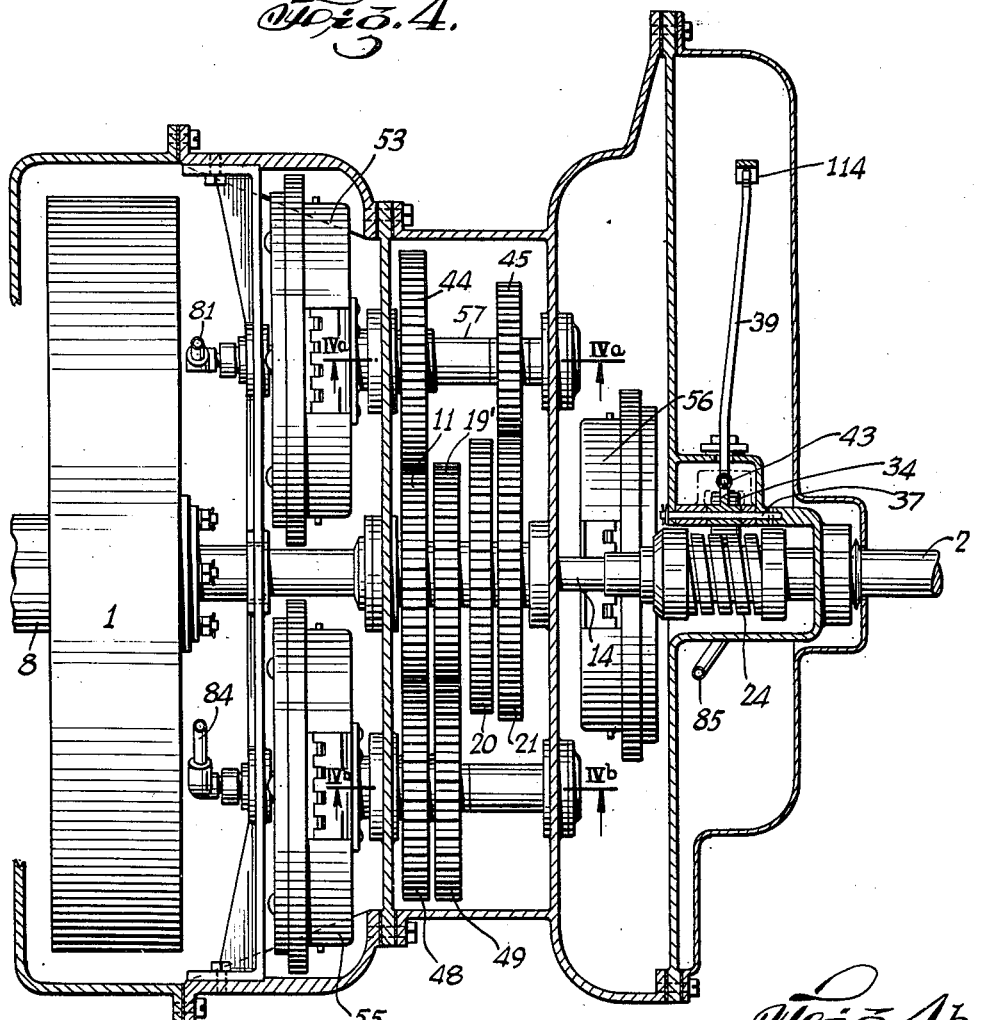
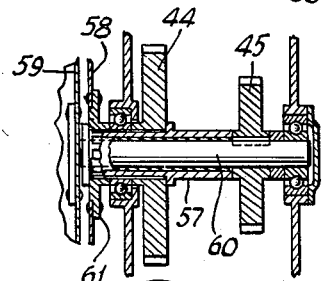
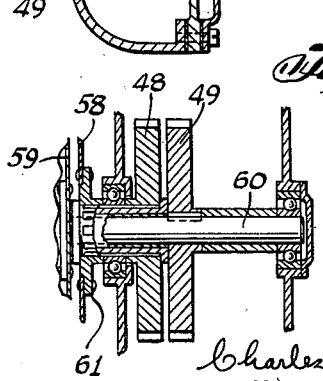
INVENTOR
Charles A. Brewer
BY
Lyman E. Dodge
ATTORNEY INVENTOR
Charles A. Brewer
BY
Lyman E. Dodge
ATTORNEY Jan. 5, 1943. C. A. BREWER 2,307,619
POWER DEVICE
Filed Jan. 25, 1939 6 Sheets-Sheet 6

INVENTOR
Charles A. Brewer
BY
Lyman E. Dodge
ATTORNEY

UNITED STATES PATENT OFFICE 2,307,619

POWER DEVICE

Charles A. Brewer, Noroton Heights, Conn., assignor of one-half to Philip J. Kury Application January 25, 1939, Serial No. 252,731

12 Claims. (Cl. 74—337)

This invention relates to automotive vehicles, especially to the driving mechanism thereof, and more particularly to the selection of the proper gear ratio train for driving.

The principal object of this invention is to provide means whereby a proper gear ratio train by which to drive the traction wheels of an automotive vehicle from the prime mover is automatically selected in accordance with the resistance offered by the traction wheels to turning.

Other objects and advantages will appear as the description of the particular physical embodiment selected to illustrate the invention progresses, and the novel features will be particularly pointed out in the appended claims.

Figure 5:
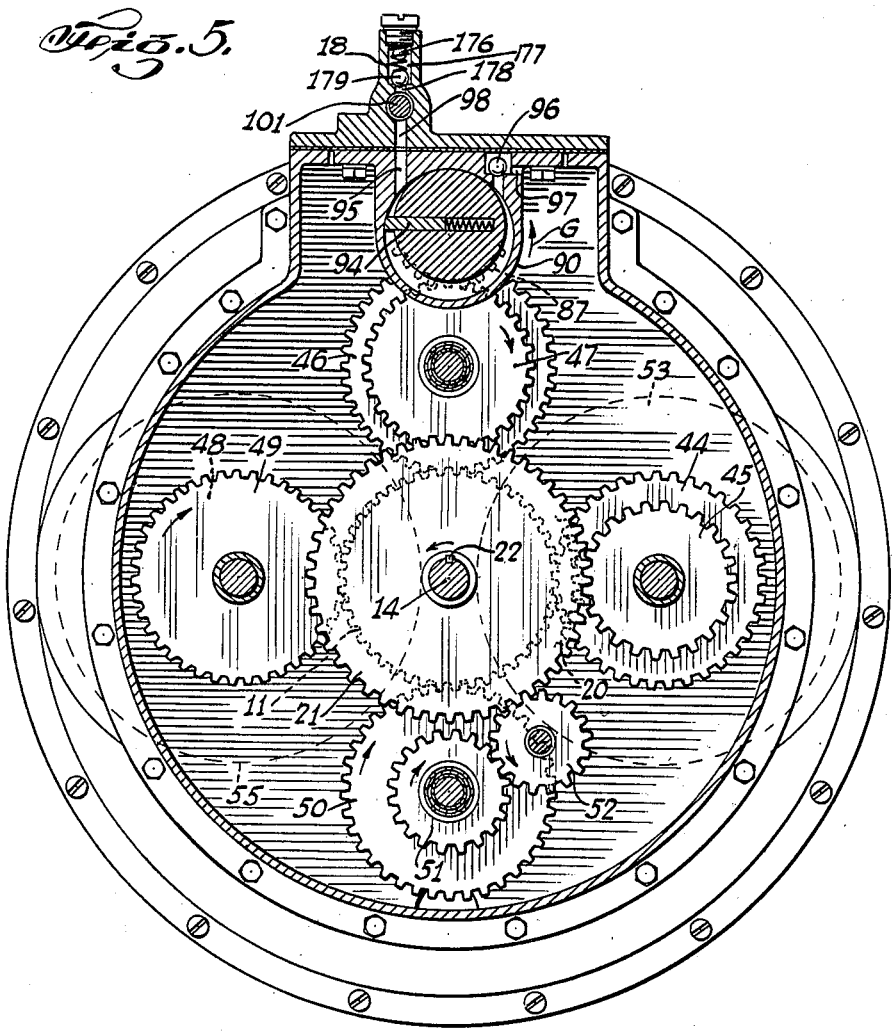
Figure 6:
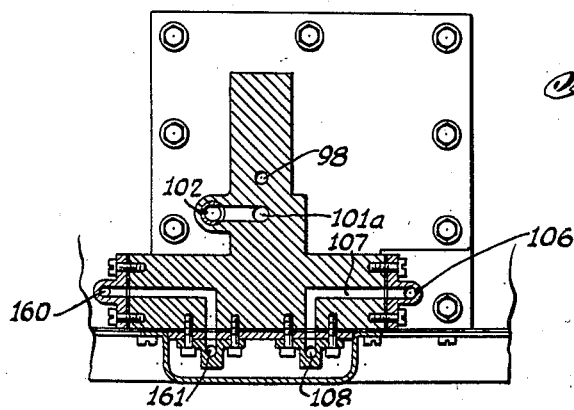
Figure 7:
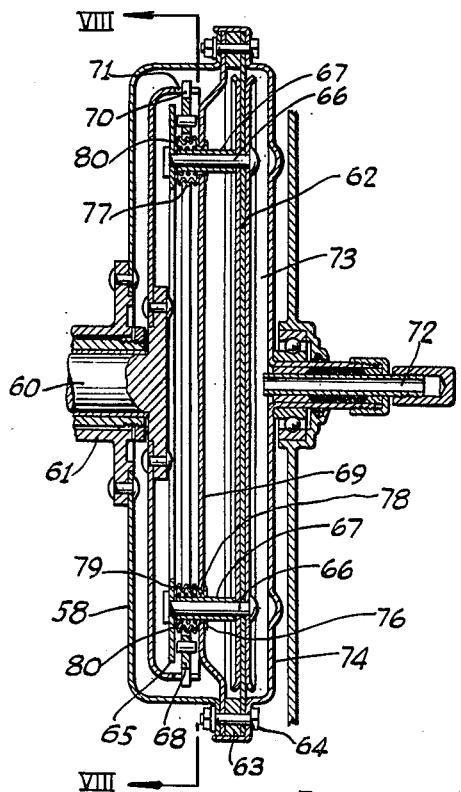
Figure 8:
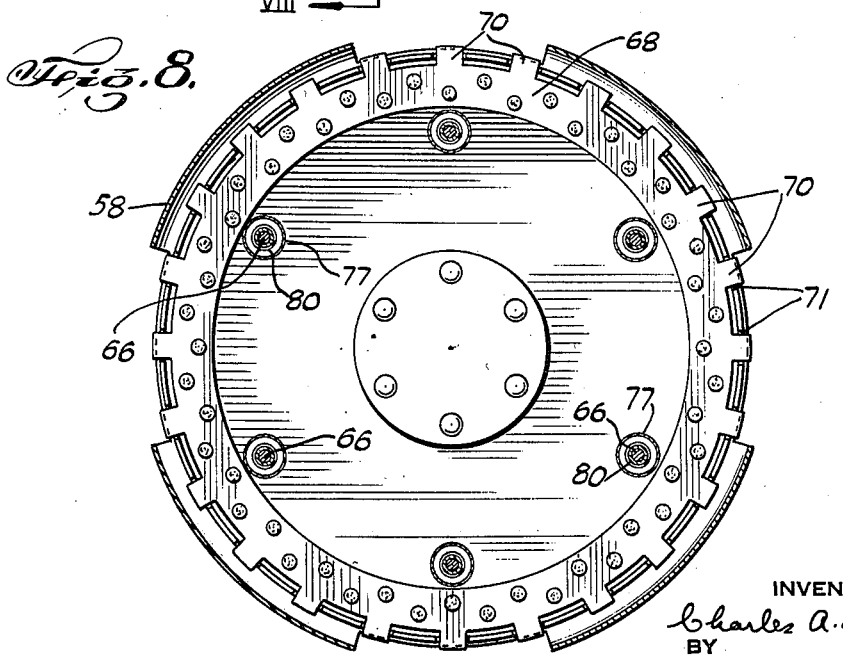

In describing the invention in detail and the particular physical embodiment selected to illustrate the invention, reference will be had to the accompanying drawings and the several views thereon, in which like characters of reference designate like parts throughout the several views, and in which:

Fig. 1 is a partly schematic and partly vertical sectional view of a form of apparatus embodying applicant's invention; Fig. 2 is a rear end view of the device illustrated by Fig. 1, that is, viewing the device Fig. 1 from the right of Fig. 1 and omitting the manually controlled levers 4 and 5 and the foot operated lever 3; Fig. 2A is a fragmentary enlarged view of that portion of the mechanism illustrated in the right hand portion of Fig. 2 but with certain parts broken away and others shown in cross-section to more clearly show the internal construction; Fig. 3 is a vertical cross-sectional view on the plane indicated by the line III—III of Fig. 1 viewed in the direction of the arrows at the ends of the line; Fig. 3A is a fragmentary top plan view of the device as shown in Fig. 1 as viewed below the mechanism 3, 4 and 5 as viewed by one standing to the rear, that is, to the right of Fig. 1; Fig. 4 is a horizontal cross-sectional view on the plane indicated by the line IV—IV of Fig. 1 viewed in the direction of the arrows at the ends of the line; Fig. 4A is a vertical cross-sectional view on the plane indicated by the line IVa—IVa of Fig. 4 viewed in the direction of the arrows at the ends of the line; Fig. 4B is a vertical cross-sectional view on the plane indicated by the line IVb—IVb of Fig. 4, viewed in the direction of the arrows at the ends of the line; Fig. 5 is a vertical cross-sectional view on the plane indicated by the line V—V of Fig. 1 viewed in the direction of the arrows at the ends of the line; Fig. 6 is a horizontal cross-sectional view on the plane indicated by the line VI—VI of Fig. 2 viewed in the direction of the arrows at the ends of the line; Fig. 7 is a vertical cross-sectional view of a clutch used in applicant's invention; Fig. 8 is a vertical cross-sectional view on the plane indicated by the line VIII—VIII of Fig. 7, viewed in the direction of the arrows at the ends of the line; Fig. 9 is a vertical cross-sectional view on the plane indicated by the line IX—IX of Fig. 1 viewed in the direction of the arrows at the ends of the line; Fig. 10 is a vertical cross-sectional view on the plane indicated by the line X—X of Fig. 1, viewed in the direction of the arrows at the ends of the line; Fig. 11 is a vertical cross-sectional view on the plane indicated by the line XI—XI of Fig. 1 viewed in the direction of the arrows at the ends of the line.

In general, applicant's invention contemplates a driver or motor, preferably of the internal combustion type. This motor in any usual or preferred manner drives a fly wheel I which, through mechanism to be hereinafter fully described in detail, drives a propeller shaft 2, that is, the shaft which is attached to the usual rear wheels, traction or driving wheels of a vehicle. As usual, the drive from the fly wheel I to the propeller shaft 2 is through gear trains which are used, one for high speed, another for intermediate speed, another for low speed and another for reverse. This gearing, unlike the ordinary and usual gearing is composed of gear wheels which are always in mesh and the particular train which will cause the propeller shaft 2 to rotate is determined by which one of four clutches has been actuated in a manner to be hereinafter fully described.

In addition to the constantly in-mesh gear trains, applicant also provides a torsion member between the fly wheel I and the propeller shaft 2. This torsion member is so arranged that it is twisted to a different extent in accordance with the resistance of the gear wheels to which the propeller shaft 2 is connected to turning and in accordance with the amount of twist, the particular gear train is determined, so that, if the greatest amount of resistance is offered by the rear wheels then the highest gear train is in action and if the lowest resistance is offered by the wheels then the lowest gear ratio is active.

The actuation of a particular one of the four clutches used in the illustration may be caused to take place manually but in the embodiment used to illustrate applicant's invention the operation is illustrated as automatic but controlled by a human act. Applicant provides a foot pedal 3 which when depressed fully prevents any clutch from being active but when released allows that particular clutch to become active which has been selected either manually or by the torsion member as being the one to be active in order to drive the propeller shaft 2 by the proper gear ratio.

In addition to the foot control by the pedal 3, there is also a manual control by the manually controlled valve handle 4 which, when in the full line position as shown in Fig. 1, allows the automatic selection and operation of the proper gear train, as controlled by pedal 3 for the three forward speeds but when in the dotted line position to the right of the full line position, as shown in Fig. 1, allows for the automatic operation, as controlled by pedal 3 of the reverse gear ratio and when in the dotted line position to the left of the full line position, as shown in Fig. 1, prevents the operation of any clutch.

In addition to the automatic shift from one gear ratio to another either up or down, applicant also provides for a manual selection of the particular gear ratio desired. This is done by the manually operable handle 5, as shown at the top right hand corner of Fig. 1. By the proper manipulation of the handle 5 a particular forward speed of the three speeds provided can be selected and the driving from the fly wheel 1 to the propeller 2 will be through the particular gear ratio selected regardless of any demand which may be made by the torsion member for a change to a lower gear ratio.

In normal operation the lever 4 would be in the full line position as shown in Fig. 1. The foot pedal 3 would be in the upper position as shown in Fig. 1. The manually operable member 5 would be in the position as shown in Fig. 1. When it is desired to start the vehicle to which the apparatus is attached and proceed forward, the foot pedal 3 would be depressed fully, then the engine would be started and then the foot pedal 3 gradually released whereupon, in ordinary operation the high speed gear train would first wind up a torque spring and then the low speed gear ratio would become effective and drive the car forward and as the car acquired speed, without any further action by the operator, the gear ratio would shift to the intermediate gear ratio and then to the high speed gear ratio. Upon climbing a hill the gear ratio would be shifted in the reverse order, going to the highest gear ratio or lowest speed ratio, if necessary, in accordance with the torque required on propeller shaft 2.

If one desired to start in the low speed gear ratio and continue in that ratio then the handle 5 would first be moved with its cross pin 6 into the notch 168 and then the pedal 3 would be depressed and the engine started and after the engine had become started the pedal 3 would be gradually released whereupon the low speed gear ratio would become active and would continue active without changing to a lower gear ratio.

If it is desired to reverse the car, then after the car had come to a standstill, which could be accomplished by depressing the pedal 3, lever 4 would be thrown to the right to the dotted line position, as shown in Fig. 1 and then the pedal 3 would be released gradually whereupon the reverse gear ratio would become active and drive the vehicle backwardly.

Although the preferred form of applicant's invention has been shown and described as one in which the different gear ratios are brought into action automatically, that is, the several clutches are automatically made active, nevertheless, applicant desires to have it understood that the particular type of clutch which has been illustrated and described is one which is usable in the ordinary and usual constructions of automotive vehicles at present in use, in that it may be substituted for the single clutch now used which is disconnected upon a shift of gear ratios and again connected after that shift of gear ratios has been accomplished and that whereas at present disengagement of the clutch is performed by power applied, usually by the foot of the operator and the engagement is caused by a spring. In applicant's preferred form of clutch illustrated the engagement would be caused by a negative pressure, such as suction, governed by a foot pedal such as 3 and the disengagement would be caused by depressing a pedal such as 3, or by a similar movement, that is, the clutch would be power operated but the power would be governed by the operator.

In Fig. 1 a fly wheel 1 is illustrated which rotates in the direction of the arrow A. This fly wheel is representative of any fly wheel connected to any prime mover such as an engine or driver of any type but usually of the internal combustion type and is representative of the ordinary fly wheel upon the ordinary automobile.

The fly wheel 1 is journalled in a bearing 8 and is suitably connected, as by bolts and flanges to a shaft 9. The shaft 9 is journalled in bearing 10, illustrated as a ball bearing, and is formed with a gear wheel 11, preferably integral therewith.

The shaft 9 is also formed with a longitudinal cavity 12 fitted with a bushing 13 in which is journalled the shaft 14. The shaft 14 is also journalled in the bearing 15, illustrated as a ball bearing, and has an end 16 journalled in a cavity 17 provided with a bushing 18 in a shaft 2. The shaft 2 is journalled in the bearing 19, illustrated as a ball bearing, and, although shown broken off, is the shaft which may be called the propeller shaft or the shaft which is connected to the mechanism directly driving the driving or traction wheels of a vehicle upon which the device illustrated in Fig. 1 is mounted.

When the fly wheel 1 rotates in the direction of the arrow A as shown in Fig. 1, the gear wheel 11 is directly driven and by means of trains of gears, to be hereinafter fully described, power is communicated to some one of the gear wheels 19', 20 or 21 depending upon the gear ratio which is desired as the driving means for the propeller shaft 2.

Each of the gear wheels 19', 20 and 21 is mounted on shaft 14 and each is keyed thereto by the key 22 so that if any one of these gear wheels is being driven such gear wheel will drive shaft 14 in the direction of the arrow B.

Shaft 14 is not directly connected to propeller shaft 2 but a torsion member is interposed therebetween. This torsion member is applicant's preferred way of illustrating his connection between shaft 14 and shaft 2 which is responsive to the torque required to move propeller shaft 2, that is, the force required to rotate shaft 2. Although applicant prefers a torsion device as illustrated he does not mean to exclude by such showing the use of any suitable or appropriate connection between shaft 14 and propeller shaft 2 which is responsive to the required force needed to turn shaft 2. In the particular form of connection illustrated, shaft 14 is provided with a flanged member 23 suitably and appropriately rigidly connected thereto as by keyways so as to rotate therewith. One end of a helical spring 24 is rigidly connected to the flange 23 in a manner, preferably as shown by the detail view Fig. 9 illustrating the connection of the other end of spring 24 to flange 27 in which the flange 27 is shown as being provided with a plurality of cut out portions 25 into which a plurality of projecting teeth 26 of the torsion spring 24 snugly fit.

The other end of the torsion spring 24, as alluded to and as shown in Fig. 9, is connected to flange 27 which is preferably formed integral with sleeve 28, the left hand end of which, as shown in Fig. 1, is provided with fingers or lugs 29 and 30, shown in end view in Fig. 11. These fingers 29 and 30 are positioned to lie in the path of the rotative movement of lugs as 31 and 32, best shown in end view in Fig. 11.

The constructions so far described are such that all rotation of fly wheel 1 with a gear ratio active drives one of the gears 19', 20 or 21 and so the shaft 14 and consequently the flange member 23 and the flange member 33 but as propeller shaft 2 is considered to be stationary as the vehicle upon which the device is positioned is considered to be stationary, the spring 24 is twisted by reason of its attachment to flange 23 and when the twist becomes sufficient, sufficient force is transmitted to flange 27 to cause flange 27 to revolve and so cause sleeve 28 to revolve and as sleeve 28 is splined by spline 29' to shaft 2, then shaft 2 is caused to revolve and in the same direction as the arrow B. During the winding up of spring 24, the lugs 31 and 32 on member 33 move in the direction of arrow C, as illustrated by Fig. 11, so that they move away from the fingers 29 and 30 but if anything should happen to spring 24 whereby it did not properly transmit the force applied to the left hand end thereof, as viewed in Fig. 1, to the right hand end thereof, as viewed in Fig. 1, then lugs 31 and 32 would contact with fingers 30 and 29 respectively and prevent the engine racing.

The spring 24 when being manufactured is made in a predetermined way in that it is subjected to known torsional force while the entire outer periphery thereof is reduced to a predetermined diameter, as by grinding, so that when the spring 24 is put in place in the position as illustrated by Fig. 1 when no torsional force is applied thereto it will have a given diameter and when definite torsional forces are applied thereto it will have definitely known external diameters. This change in diameters as force is applied thereto will be a measure used for selecting a gear ratio between fly wheel 1 and shaft 14 for the driving of shaft 14.

The changes in diameter of the torsion spring 24 may be taken advantage of in various ways to select the gear ratio desired, but in Fig. 2 applicant has shown the torsion spring 24 as being positioned adjacent an antifriction wheel 34 positioned on a stud 35 rigidly attached to a lever 36 pivoted at 37 so that a decrease in diameter of spring 24 allows wheel 34 impelled by spring 38 to move clockwise about the pivot 37, as viewed in Fig. 2, and so causes lever 36 pivoted at 37 to likewise move clockwise.

The pivot 37 not only supports the lever 36 but also pivotally supports the valve lever 39 which is positioned between shoulders 40 and 41, on lever 36 and held in position therebetween by balanced springs 42 and 43 so that movement of lever 36 causes an oscillation of valve lever 39 from the full line position as shown in Fig. 2 toward and finally to the dotted line position as shown in Fig. 2.

This movement of valve lever 39, as will be fully hereinafter described, is used as the means for selecting a proper gear ratio by which to drive shaft 14.

In the particular form of applicant's device illustrated, applicant has contemplated making use of three different gear ratios for forward speeds and one further gear ratio for reverse movements of the vehicle to which the device is attached. The main driving gear for all gear ratios is gear 11.

The first gear ratio, that is, the highest gear ratio, corresponding to the lowest driven speed of the vehicle includes gear 11, shown in Fig. 1 and also in Fig. 4, gear 44, gear 45 and gear 21.

The intermediate gear ratio, that corresponding to intermediate speed includes gear 11 shown in Fig. 1, gear 46, gear 47 and gear 20.

The low gear ratio corresponding to the highest speed of the vehicle includes gear 11, shown in Fig. 1 and also shown in Fig. 4, and gears 48, 49 and 19'.

The reverse driving gear ratio includes gear 11 and gears 50 and 51 shown in Fig. 1 and also well shown in Fig. 5 together with the gear 52, shown only in Fig. 5, driving gear 21.

All of the gears hereinbefore mentioned are constantly in mesh and are preferably of the helical or herringbone type. Although all of the gears are always in mesh, no one of the gear trains is active to drive the vehicle unless some one of four different separate and independent clutches has been operated. The clutch for rendering the high gear ratio effective to drive is the clutch designated as a whole by 53 and shown in side elevation in Fig. 1 and in top plan in Fig. 4. The clutch which when operated makes the intermediate gear ratio effective is the clutch designated as a whole by 54 and shown in Fig. 1.

The clutch which renders the low gear ratio effective when actuated is the clutch designated as a whole by 55 and illustrated in top elevation in Fig. 4.

The clutch which renders the reverse driving gear ratio effective when operated is the clutch designated as a whole by 56 and shown in side elevation in Fig. 1 and in top plan view in Fig. 4.

The means by which a particular gear ratio is rendered effective or active by the operation of a clutch is illustrated for all cases by Fig. 4A together with Figs. 7 and 8, that is, in Fig. 4A which is a vertical cross-sectional view through the gears 44 and 45 of Fig. 4, the gear 44 is driven from gear 11 and is keyed to sleeve 57 which is rigidly attached to a casing 58 forming a part of a clutch mechanism while the other portion 59 of the clutch mechanism is rigidly attached to shaft 60 to which is keyed gear 45 so that when the two portions 58 and 59 of the clutch device are caused to revolve together or are clutched together then both gears move together, otherwise gear 45 does not revolve for driving purposes. The parts 58 and 59 are so designated in Fig. 7, 58 is part of the outer casing of a clutch device, 59 is an inner member of a clutch device. When the member 59 is so acted upon that it must revolve with 58 then the clutch is said to be operated to become active and anything connected to 58 such as 60 will then revolve with anything connected with 59 such as 61.

The clutch device, as shown in Figs. 7 and 8, includes an outer casing 58 and a diaphragm 62 held rigidly to the casing 58 in any suitable and appropriate manner as by filler rings as 63 and bolts 64. The diaphragm 62 is connected to a clutch plate 65 in any suitable and appropriate manner as by rivets, as 66 and spacer sleeve 67 so that when diaphragm 62 is moved, especially when moved to the right, as viewed in Fig. 7, clutch plate 65 will also move to the right as viewed in Fig. 7 and will contact the main clutch plate 68 which in turn will contact with and drive clutch plate 69. The central or main plate 68 is provided with a plurality of teeth 70, as best shown in Fig. 8, which project into spaces 71 cut in the outer rim of the member 59. From this construction it will be seen that a movement of diaphragm 62 to the right as viewed in Fig. 7 will cause plates 65, 68 and 69 to contact and then if either 53 or 59 is being driven, 59 or 58 will be driven through the clutch because 69 is connected to 58, and 68, if rotated, must drive 59.

The means by which a clutch, as illustrated in Fig. 7, is rendered active or operated to cause a gear ratio to become active is by use of a means which will cause diaphragm 62 to move, and in the preferred form, applicant contemplates causing this movement by suction applied through pipe 72 which opens into a closed chamber 73 of which the diaphragm 62 forms one wall, the other and opposite side wall to 58 designated 74 is rigid so that if suction is applied through pipe 72, the diaphragm moves to the right as viewed in Fig. 7.

As applicant contemplates that all of the gear trains and the torsion member and the clutch casings shall be immersed in a bath of oil, it is necessary to prevent this oil from reaching the chamber 73 formed by diaphragm 62 and plate 69 as it would interfere with the movement of diaphragm 62 caused by the suction. Applicant, therefore, makes an oil tight connection at sleeve 67 by passing one end 76 of a metallic bellows 77 through the orifice 78 in plate 69 which is bent backwardly and attached oil tight to the plate 69 and the other end 79 of the bellows is attached oil tight to the plate 65 so that although movement is allowed between plates 65 and 69 no oil can pass in around the sleeve 67 into the chamber 73. Applicant also inserts the coil spring 80 normally tending to push the plates 65 and 69 apart.

All of the clutches 53, 54, 55 and 56 are similarly constructed and operate similarly.

Each of the clutches is connected with a source of suction by a pipe, illustrated by 72. The clutch 53, which is the clutch for the high gear ratio or low speed is connected by pipe 81, as best shown in Fig. 2, with a valve box 82. The clutch 54 which is the clutch which renders the intermediate gear ratio active is connected by pipe 83 to valve box 82. Clutch 55 which is the clutch which renders the low gear ratio high speed gears active is connected by pipe 84 to the valve box 82. The reverse gear driving clutch 56 is connected by pipe 85 to a source of suction through the manually operable valve designated as a whole by M and shown near the upper right hand corner of Fig. 1.

As shown in Fig. 1, there are two gear wheels for driving vacuum pump. One of these gear wheels is designated 86 and the other designated 87. Gear wheel 86 is constantly in mesh with gear wheel 89 which as shown is attached to the side of gear wheel 46 which is driven by gear wheel 11 so that so long as fly wheel 1 is rotating gear wheel 86 is being rotated in the direction of arrow D. When the vehicle is being moved, that is, when any one of gears 19', 20 or 21 is being moved, gear wheel 47 meshing with gear wheel 87 drives gear wheel 87. If the vehicle is moving forwardly, that is, the shaft 14 is moving in the direction of the arrow B then the gear wheel 87 moves in the direction of the arrow E but if the reverse gear train is operative and gear wheel 21 moves clockwise and shaft 14 clockwise, that is, contrary to the direction of the arrow B, then gear 87 moves contrary to the direction of the arrow E. If the direction of the vehicle were always forwardly, that is, in one direction only, both gears 86 and 87 would be connected directly to shaft 89 shown in Fig. 10 in cross-section and a vacuum pump designated as a whole by 90 would always be operated if either the fly wheel 1 were turning or the vehicle were moving transmitting motion to propeller shaft 2 and so to shaft 14, but as at times, the motion of shaft 14 is reversed and so the motion of gear 87, it is necessary to interpose an overrunning clutch between each of gears 86 and 87 and the shaft 89. This friction clutch interposed between each of these gears and shaft 89 is shown in cross-section in Fig. 10 in which spring pressed balls 91 bear upon the shaft 89 and upon the inclined surfaces as 92. If the hub 93 of a gear wheel rotates counterclockwise, that is, in the direction of the arrow F, as shown in Fig. 10, then the hub 93 will be clutched to the shaft 89 and motion will be transmitted to the vacuum pump 90 but if the hub 93 moves in a clockwise direction, as viewed in Fig. 10, then the hub moves idly over the shaft 89 and power is not transmitted to the shaft 89 by the movement of the gear wheel and its hub. By such construction the vacuum pump 90 is always driven when the fly wheel 1 is moved in the direction of the arrow A and is also driven when the vehicle is moving forwardly, regardless of whether or not the engine is running, but in a case where, due to slip of the driving-wheels or other cause, the fly wheel 1 over-runs the propeller shaft 2 the relative motion thereby set up between gear wheels 86 and 87 is taken care of by the clutch between the hubs of the gear wheels and the shaft 89 and in the case where the propeller shaft is rotating clockwise as when the vehicle is being driven backwardly then if the engine is running the pump 90 is creating a vacuum.

The pump 90 is shown in sectional elevation in Fig. 5 and has an outer casing within which the shaft 89 rotates. This shaft 89 has a spring pressed plunger 94 positioned therein in a slot which plunger is pressed against the inner surface of the pump 90 and as the pump shaft rotates in the direction of the arrow G it exhausts air from the duct 95 and forces it out under the valve 96 to atmosphere at 97.

The duct 95 connects with a duct or port 98 in a graduating valve casing 99. The duct 98 communicates with the longitudinal rod valve duct 100 and when the graduated rod valve 101 is in the position as shown in Fig. 1 there is a communication from duct 98 to duct 101a and suction is applied to a pipe 102 which connects with the port 103 in the manually operable valve M. When the slide valve 104 of the manual valve M is in the position as shown in Fig. 1, there is a through connection from port 103 through to 105 and pipe 106. The pipe 106 communicates with duct 107, best shown in Fig. 6, and so to duct 108 which connects with pipe 109 connected, as best shown in Fig. 2A, to the duct 110 having ports 111, 112, and 113, so that suction is applied to each one of these ports.

When the clutch selector slide valve 114, as best shown in Fig. 2A, is in a position in which it would be when 39 is in the dotted line position, as shown in Fig. 2, that is, when the torsion spring 24 is fully twisted, the through tapered passage 115 in the clutch selector slide valve 114 would cause port 113 to communicate with port 116 and so through the adjustable valve 117 to pipe 81. As pipe 81 is connected to clutch 53 which when operated renders active the high gear ratio or low speed gears, these gears would operate to drive the vehicle.

If the vehicle is started by means of the high gear train, then, after it has started, the torsion on spring 24 would become less, and it would expand and move arm 39 in Fig. 2 to a position midway between the dotted line position and the full line position, and would bring 115, as best shown in Fig. 2A, in register with port 118 and so through adjustable valve 119 into communication with pipe 83 and so to clutch 84 which when operated renders active the intermediate speed or intermediate gear ratio train so that the vehicle would then be driven by the intermediate gear ratio train.

If after the vehicle has been driven by the intermediate gear ratio train the torsion upon spring 24 becomes less it will assume its full diameter and move arm 39 to the full line position, as shown in Fig. 2, thereby moving the clutch selector slide valve 114 to the position, as shown in Fig. 2A, in which 115 communicates between ports 111 and 120 and through adjustable valve 121 to pipe or duct 84 and so to the low ratio gear train or high speed driving gear train.

As clutch selector slide valve 114 shifts from its dotted line position, as shown in Fig. 2, to its full line position, as shown in Fig. 2, and as perhaps best seen in Fig. 2A, it brings projections and notches successively under rotatable disc 122, journalled on pivot 123 which pivot is positioned in a reciprocatable member 124. When the clutch selector slide valve 114 is moved from the position, as shown in Fig. 2A downwardly, as viewed in the figure, the projection 125 would first come under roller 122 and raise the roller together with slide 124 to the left, as viewed in Fig. 2A, which would in turn move diaphragm 126 to the left, as viewed in Fig. 2A, together with the slide valve 127. When slide valve 127 is sufficiently moved to the left, as viewed in Fig. 2A, communication is established between port 129 and duct 129 which opens into closed chamber 130 on one side of the diaphragm 126 so that as port 128 is connected by pipe 131 to suction chamber 110 suction or negative pressure is applied to the right hand side of the diaphragm 126, as viewed in Fig. 2A, thus tending to pull slide 124 and roller 122 to the right, as viewed in Fig. 2A, and down the incline into notch 132 thereby assisting in the quick movement of clutch selector valve 114 also definitely positioning it so that passage 115 is correctly aligned with some one of the ports 116, 118 and 120 and, in the particular case selected for illustration, bringing it directly in line with port 118. When the diaphragm 126 pulls the slide 124 to the right, as viewed in Fig. 2A, it also operates slide valve 127 to cut off communication with the suction pipe 131 and to open a communication with atmosphere through port 133, duct 134, duct 135 and through air filter material 136 and orifices 137. The rate of air admission being regulated by the adjustable coned knurled headed screw 138.

Each time the clutch selector slide valve 114 is moved from one of its positions to the next position, it is operative by reason of the projections 125 and 139 and the depressions 140, 141 and 142 to be brought to a definite predetermined position.

In order that there shall be no back pressure upon diaphragm 126 when being moved to the left, as viewed in Fig. 2A, the chamber on the left hand side thereof is vented to atmosphere at 143.

It is to be observed that the roller 122 acts as a lock for slide 114 for a certain predetermined period of time. This time is determined by the adjustment of screw 138 which regulates the velocity of admission of atmospheric air back of the diaphragm 130 so as to destroy the vacuum which has been created therein. During the time in which the atmospheric air is flowing into the space back of diaphragm 130 the slide 114 is locked in position so that there is a time interval allowed in which after the last clutch that was in operation has been released the next clutch to be made effective has an opportunity to become effective.

In the normal operation of a vehicle equipped with applicant's invention, the vehicle would be stationary when the fly wheel 1 is first started into rotation and in the normal operation of a vehicle equipped with applicant's invention before starting the fly wheel 1, pedal 3 would be depressed, preferably by the left foot of the vehicle operator. The depression of this pedal through the link 144 and the ball crank 145 and link 146 would move the valve rod 101 to the right, as viewed in Fig. 1, so that the extreme end thereof would be about in the position as indicated by the dotted line 147 and the shoulder 148 would be at about the position indicated by the dotted line 149 so that air and atmospheric pressure could pass through the orifices 150 of the air filter 151 and the orifices 152 of the air filter 151 to the port 153 and so into the space 100 and from thence into duct 101 and so into pipe 102, so that atmospheric pressure would exist in the chamber 73, as shown in Fig. 7, of all of the clutches and consequently no one of the clutches would be operated to render any gear ratio active and at the same time arm 39 would be in the full line position as shown in Fig. 2 and the clutch selector slide valve 114 would be in the full line position as shown in Fig. 2 causing communication between port 111 and port 120 as illustrated in Fig. 2A. In order, under the conditions above described, to start the vehicle, the operator would gradually let up on pedal 3 and allow it to gradually assume the full line position as shown in Fig. 1. By so doing he would first cut off the entrance of air at 153 to the space 100 and then would apply suction through pipe 102 and so to pipe 109 as shown in Fig. 2A and consequently to pipe 84 connected to the clutch for rendering the low gear ratio or high speed gear train active. This suction could be applied gradually and would in practice be applied gradually and this result is accomplished by the tapered condition of rod 101 as indicated at 156, that is, the farther the rod 101 is moved to the left as viewed in Fig. 1 the greater would be the free opening between duct 98 and pipe 102 and so the greater the suction.

After the spring 24 has been sufficiently wound up and has caused the movement of lever 39 so that slide valve 114 moves to the position it will be in that lever 39 is in the dotted line position as shown in Fig. 2, then suction would be applied to the pipe 81 and the high gear ratio clutch would be operated and the vehicle would start.

After the vehicle has once been started, it then continues under the automatic control of the torsion spring 24, that is, as the torsion spring increases in diameter by reason of the less force required to revolve propeller shaft 2, the roller 24 is moved more and more counterclockwise about pivot 37 as shown in Fig. 2 and arm 39 is moved more and more from its dotted line position toward its full line position. When arm 39 reaches the mid position between its dotted line position and its full line position as shown in Fig. 2 the gear ratio automatically changes from the high gear ratio to the intermediate gear ratio and then later as the arm 39 moves to its full line position as shown in Fig. 2, the low gear ratio of the high speed gear is placed in operation.

As the vehicle encounters conditions which require more and more force to be applied to the propeller shaft 2 to cause it to rotate, the torsion spring 24 is twisted more and more and roller 34 impelled by spring 38 following up spring 24 rotates lever 36 more and more clockwise about pivot 37 and so moves arm 39 in a direction from the full line position, as shown in Fig. 2, to the dotted line position and causes the clutch selector slide valve 114 to successively cut off port 120 from port 111 and cause port 112 to connect with port 118 and then port 113 to connect with port 116 so that the gear ratios are rendered active in the reverse order to that hereinbefore described.

In case it is desired to move the vehicle rearwardly or reverse, then the arm 4, as shown in Fig. 1, would be moved to the dotted line position 157 which would bring duct 103 into communication with port 158 so allowing suction to be applied to pipe 159 which connects with duct 160, as shown by reference to Fig. 2 and Fig. 6. The duct 160 communicates with port 161 which connects to pipe 85, which is shown in Fig. 2, and so to reverse clutch 56. This clutch 56 would be operated in exactly the same manner as the forward gear ratio clutches are operated, that is, by first depressing the pedal 3 to its fullest extent and then gradually releasing it while arm 4 is in the dotted line position 157.

If it is desired to render impossible the operation of any clutch regardless of the position of pedal 3 then arm 4 would be moved into the dotted line position 162, as shown in Fig. 1, thereby moving slide 104 to the extreme right, as viewed in Fig. 1, thereby bringing cut away portion 163 into communication with ports 105 and 158 whereby those ports are connected with atmosphere through orifices 164 and 165 through the filter material 166.

While the vehicle to which the applicant's invention has been attached is moving in either direction, power may be disconnected from the rear wheels, that is, from propeller shaft 2 by completely depressing the pedal 3 which will cause all of the clutches to become normal and non-operative or lever 4 could be thrown to the neutral position 162. In practice, if one desired to stop the vehicle equipped with the invention but did not desire to stop the engine it would probably be easiest to shift lever 4 to the position 162, that is, the neutral position in order to stop the vehicle.

Certain situations arise in driving an automotive vehicle which makes it desirable to be able to drive continuously with the engine connected to the propeller shaft through not lower than a desired high particular gear ratio. Applicant provides for this contingency by providing the manually operable handle 5 which acts as a manually operable clutch selector. The handle 5, as best shown in Fig. 1 connects with a link 167 provided with a cross pin 6. Normally the handle 5 and the link 167 and the cross pin 6 are in the position as illustrated in Fig. 1 but if the operator of the vehicle to which the invention is attached desires to select a particular gear ratio and have that gear ratio maintained regardless of decrease in wheel resistance, then the handle is drawn to the right, as viewed in Fig. 1, so that cross pin 6 rests in some one of the slots 168, 169 or 170. If the cross pin 6 rests in slot 168 then as link 167 is pulled to the right, as viewed in Fig. 1, to bring it into that position the Bowden wire 171 is pulled to the right, as viewed in Fig. 1, and the end of the Bowden wire 171, as best shown in Fig. 2A, is drawn upwardly, as viewed in Fig. 2A, and connecting to arm 172 pivoted at 173 moves the end 174 of the lever 172 downwardly against clutch selector slide valve 114 and moves the slide valve to a position where passage 115 connects ports 113 and 116 and so operates the high gear ratio clutch to render active the high gear ratio gear train so that thereafter while lever 4 is in the full line position, as shown in Fig. 1, and pedal 3 is fully depressed, if the pedal 3 is gradually allowed to assume its normal full line position as shown in Fig. 1 by reason of spring 175 the vehicle will be driven by the high gear ratio train.

If the intermediate gear ratio is desired as a temporary continuous gear drive then cross pin 6 would be put in slot 169 and if the low gear ratio train is desired as a temporary continuous gear drive, the cross pin 6 would be placed in slot 170.

When slide valve 114 is depressed by lever 174, then lever 39 can no longer move it upwardly. Any tendency for 39 to move upwardly is taken up by spring 42.

It is to be observed that the passage 115 in the clutch selector slide valve is tapered both ways so that when the slide valve is moved from one operative position to another the vacuum is applied to the clutches gradually as the full opening is not completely available until the mid position of the passageway 115 is in alignment with the opposite ports.

It is also to be observed that applicant's arrangement provides a means whereby a manual selection of the clutch to be operated may be made by the manually operable handle 5 and that thereafter the clutch is applied gradually by the operation of the foot pedal 3. It is further to be observed that in the ordinary operation of the automatic shift from one gear ratio to another that the particular clutch and gear ratio operative is determined in accordance with the resistance to turning of the rear wheels of the vehicle and that when a shift is automatically made from one gear ratio to another the vacuum is applied gradually to the next operative clutch by reason of the tapered construction of the through passage 115. It is also to be observed that as one clutch, say the clutch connected to pipe 83 is having a vacuum created therein the clutch previously operative, that is, say the clutch connected to pipe 84 has atmospheric air admitted thereto through the port 181 that the valve rod 114 moves downwardly as viewed in Fig. 2A. When the valve rod 114 moves upwardly then the port 182 serves a similar purpose for the clutches connected to pipes 81 and 83, it being observed that 181 serves to admit atmospheric air to both the clutches connected with pipes 83 and 84.

It is also to be observed that in case one driving a vehicle equipped with applicant's invention desires to use the engine as a brake in going down hill that the necessary and desired amount of braking is secured by operating the manually operable handle 5 to position the cross pin 6 in the desired notch. If the full braking is required then the cross pin 6 will be placed in notch 168 so as to render the high gear ratio effective but if a less braking effect is required then the cross pin 6 will be placed in the notch 169 so that the intermediate gear ratio would be effective between the wheels and the engine.

In Fig. 1 at 176 is shown a pipe which connects with a chamber 177 connecting with port 178 in which there is interposed a valve 179 spring pressed by a spring 180. The object of this pipe 176 and its connections is to show that another source of vacuum may be employed other than pump 90 alone as the vacuum on the intake manifold of an engine.

Although applicant has herein illustrated and described his torque member as being used to automatically select a certain gear ratio, it is to be understood that this particular use is not necessarily exclusive, and applicant does not intend to exclude the use of his torque member for governing any means concerned in the driving of a vehicle if it is desirable to govern said means by the torque member.

Applicant desires to have it understood that although his torque device has been illustrated and described as operating mechanically through the agency of a vacuum, applicant does not intend to exclude by such showing the control by the torque member 24 of other control means such as pressure or hydraulic, magnetic, electric or other agencies of control.

Although applicant has shown herein the use of his torque member 24 as controlling which of several different gear ratio trains constantly in mesh shall be operative to drive the driven shaft, nevertheless, it is to be understood that applicant does not intend to exclude by such showing the use of his torque member 24 to govern the engagement and disengagement of gears of gear trains in which the gears are not always in mesh nor to exclude the use of the principle embodied in operating ordinary slide gear transmissions either progressive or of the selective type nor to exclude the use of the torque member to regulate the degree and speed of application of power to the resistance to movement, as the resistance to turning of shaft 2.

Although applicant has shown a particular torque responsive member it is to be understood that he does not thereby exclude other types of torque responsive members and does not intend to exclude other mechanical or exclude fluid or electric type torque members, nor does applicant intend to exclude by the particular showing the use of a torque member such as 24 to control the gradual application of power by a single clutch where the gear train ratio may be always the same or shifted manually, electrically or otherwise.

Although applicant has particularly described one particular physical embodiment of his invention and explained the operation, construction and principle thereof, nevertheless, he desires to have it understood that the form selected is merely illustrative, but does not exhaust the possible physical embodiments of the idea of means underlying his invention.

What I claim as new and desire to secure by Letters Patent of the United States is:

1. In an automotive vehicle, in combination: a prime mover; a propeller shaft; a shaft intermediate the prime mover and the propeller shaft; a plurality of different ratio gear trains between the prime mover and the intermediate shaft, each gear train including a friction clutch; means driven by the prime mover for creating a vacuum; a foot pedal; a vacuum graduating valve connected to and operable by the foot pedal and positioned to connect the vacuum means to atmosphere upon a complete depression of the foot pedal; means connecting the vacuum means with each of the clutches and including ducts positioned so that a manipulation of the said foot pedal causes a gradual change in the vacuum applied to the ducts; a selective slide valve; said means also including ducts connecting each of the clutches with ports adjacent the slide valve, said slide valve in its different positions furnishing a through passage from the vacuum means to each of the ducts connected with the clutches; means responsive to the resistance to turning offered by the propeller shaft and means governed by said last mentioned means for positioning the selector slide valve whereby the resistance to turning offered by the propeller shaft determines the position of the slide valve which clutch is operated and which gear ratio train is operative between the prime mover and the intermediate shaft and whereby vacuum is applied gradually by the foot pedal to cause the first engagement of a clutch and thereafter the clutches engage and disengage automatically in accordance with the resistance offered by the propeller shaft.

2. A device as specified in claim 1 further characterized by having a manually operable device movable to positively position the selector slide valve whereby a predetermined particular gear ratio train is rendered operative continuously.

3. A device as specified in claim 1 further characterized by a device including a manually operable handle and a valve mechanism connected to the handle, said valve mechanism including ports interposed in the duct line of the vacuum generating means, said valve means being adapted to be moved by the handle to move the ports into and out of operative alignment whereby when the handle is in one position automatic selection of the clutches to be operated is effected but when in another position such automatic operation is prevented.

4. In a power system of the class in which there is a driving shaft and a driven shaft and a plurality of gear trains of different ratios for driving the driven shaft by the driving shaft wherein the active gear ratio is selected by the resistance to driving of the driven shaft, the combination of a torque member adapted to assume different diameters; a member positioned adjacent the periphery of the torque member; a pivoted lever to which the said member is attached; a spring positioned to force the said lever in a direction such that the said member will always bear against the periphery of the torque member so that the said member is always in contact with the periphery of the torque member; an arm pivoted to the said lever, said lever being provided with two shoulders between which the arm is positioned and a balance spring positioned between each shoulder and the opposite sides of the arm whereby the arm moves in correspondence with the said member and the position of said arm determines the gear train which is active.

5. In a power device, in combination: a drive shaft; means actuated by said drive shaft for producing a vacuum; a plurality of vacuum operated clutch devices; each of said vacuum operated clutch devices being associated with a different ratio gear train; a driven shaft; an intermediate shaft, said intermediate shaft connected to said driving shaft through the clutch devices and the different ratio gear trains; means for driving the driven shaft from the intermediate shaft variable in accordance with the resistance offered the driving of the driven shaft, and means governed by said last named means for operating one of the plurality of vacuum operated clutch devices from the means for producing the vacuum for causing the associated gear train to drive the intermediate shaft in accordance with the resistance offered to the driven shaft; manually operable means for cutting off connections between the vacuum and the vacuum operated clutch device and for gradually allowing full communication.

6. In a power device, in combination: a drive shaft; means actuated by said drive shaft for producing a vacuum; a plurality of vacuum operated clutch devices; each of said vacuum operated clutch devices being associated with a different ratio gear train; a driven shaft; an intermediate shaft, said intermediate shaft connected to said driving shaft through the clutch devices and the different ratio gear trains; means for driving the driven shaft from the intermediate shaft variable in accordance with the resistance offered the driving of the driven shaft, and means governed by said last named means for operating one of the plurality of vacuum operated clutch devices from the means for producing the vacuum for causing the associated gear train to drive the intermediate shaft in accordance with the resistance offered to the driven shaft; manually operable means for cutting off connections between the vacuum and the vacuum operated clutch devices and for gradually allowing full communication; and further manual means for entirely cutting off communication between the vacuum and the vacuum operated clutch devices.

7. In a power device, in combination: a drive shaft; means actuated by said drive shaft for producing a vacuum; a plurality of vacuum operated clutch devices; each of said vacuum operated clutch devices being associated with a different ratio gear train; a driven shaft; an intermediate shaft, said intermediate shaft connected to said driving shaft through the clutch devices and the different ratio gear trains; means for driving the driven shaft from the intermediate shaft variable in accordance with the resistance offered the driving of the driven shaft, and means governed by said last named means for operating one of the plurality of vacuum operated clutch devices from the means for producing the vacuum for causing the associated gear train to drive the intermediate shaft in accordance with the resistance offered to the driven shaft; manually operable means for cutting off connections between the vacuum and the vacuum operated clutch devices and for gradually allowing full communication; further manual means for entirely cutting off communication between the vacuum and the vacuum operated clutch devices; and a further manually operable means operable to a plurality of positions for cutting off all but a selected one of the vacuum operated clutch devices from the vacuum.

8. In an automotive vehicle, in combination: a prime mover; a propeller shaft; a vacuum pump; means for operating said vacuum pump to create a vacuum; and means for operating said last named means operable either by the prime mover or by the propeller shaft; a clutch adapted to connect the prime mover and the propeller shaft; and means for operating said clutch by the vacuum created by said vacuum pump.

9. In a power device, in combination: a driving shaft; a shaft adapted to be driven; a fluid pressure device interposed between the driving shaft and the driven shaft transmitting power from the driving shaft to the driven shaft; a vacuum pump; means for operating said vacuum pump to create a vacuum; means for operating said last named means operable either by the driving shaft or by the driven shaft; and means governed by the resistance of the driven shaft to driving for controlling the application of the fluid pressure to the fluid pressure device.

10. In a power device, in combination: a driving shaft; a shaft adapted to be driven; means for transmitting power from the driving shaft to the driven shaft, said means including a movable member operable by atmospheric pressure; vacuum means for governing said movable member and means responsive to the resistance to driving of the driven shaft for controlling the vacuum means.

11. In an automotive vehicle, in combination: a prime mover; a propeller shaft; a clutch adapted to connect the prime mover and the propeller shaft; a vacuum power device for operating said clutch; means for creating a vacuum in said power device either by the prime mover or the propeller shaft and torque responsive means to control the driving effort of said clutch.

12. In an automotive vehicle, in combination: a prime mover; a propeller shaft; a vacuum creating means; means for operating said last named means operable either by the prime mover or by the propeller shaft; a clutch adapted to connect the prime mover and the propeller shaft and means for operating said clutch by the vacuum means.

CHARLES A. BREWER.